United States Patent
Schwartz et al.

(10) Patent No.: US 11,352,768 B2
(45) Date of Patent: Jun. 7, 2022

(54) LOCKING OUT A MACHINE TO PROHIBIT MOVEMENT

(71) Applicant: Caterpillar Inc., Deerfield, IL (US)

(72) Inventors: Timothy D. Schwartz, East Peoria, IL (US); Russell J. Pugh, Chester-le Street (GB); James B. McKnight, Champaign, IL (US); David R. Wisley, Darlington (GB)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 16/513,444

(22) Filed: Jul. 16, 2019

(65) Prior Publication Data

US 2021/0017737 A1  Jan. 21, 2021

(51) Int. Cl.
| | |
|---|---|
| E02F 9/24 | (2006.01) |
| B60W 50/12 | (2012.01) |
| B60W 30/09 | (2012.01) |
| B60W 10/184 | (2012.01) |
| B60W 10/196 | (2012.01) |
| B60W 10/20 | (2006.01) |

(52) U.S. Cl.
CPC ............... *E02F 9/24* (2013.01); *B60W 30/09* (2013.01); *B60W 50/12* (2013.01); *B60W 10/184* (2013.01); *B60W 10/196* (2013.01); *B60W 10/20* (2013.01); *B60W 2300/17* (2013.01); *B60W 2520/28* (2013.01); *B60W 2554/00* (2020.02)

(58) Field of Classification Search
CPC ......... E02F 9/24; E02F 9/2079; E02F 9/2083; E02F 9/0841; E02F 3/435; E02F 9/2087; E02F 9/265; E02F 9/262; E02F 9/2033; B60W 50/12; B60W 30/09; B60W 2554/00; B60W 2300/17; B60W 2520/28; B60W 10/184; B60W 10/196; B60W 10/20; B60W 30/18054; B60K 28/10
USPC ........................................................... 701/70
See application file for complete search history.

(56) References Cited

U.S. PATENT DOCUMENTS

| | | | | |
|---|---|---|---|---|
| 6,030,169 | A * | 2/2000 | Rossow | B60K 28/04 414/680 |
| 6,174,255 | B1 * | 1/2001 | Porter | B60K 17/34 180/235 |
| 8,020,659 | B2 | 9/2011 | Schultz et al. | |
| 9,163,387 | B2 | 10/2015 | Yuan et al. | |
| 9,561,820 | B2 | 2/2017 | Moberg | |
| 9,797,247 | B1 | 10/2017 | Nelson et al. | |
| 9,983,578 | B2 | 5/2018 | Kandula et al. | |
| 2002/0195275 | A1 * | 12/2002 | Brand | E21B 44/00 175/24 |
| 2008/0255735 | A1 * | 10/2008 | Marathe | B60K 28/165 701/50 |

(Continued)

*Primary Examiner* — B M M Hannan
(74) *Attorney, Agent, or Firm* — Schwegman, Lundberg & Woessner

(57) ABSTRACT

A construction machine includes a system and method for performing a lockout or stand down of the machine to prohibit movement of the machine or one or more components of the machine, without shutting down the machine. Information about the status of the machine or a component thereof can be collected and relayed to an electronic control module (ECM) to determine whether to lockout the construction machine. If appropriate, the ECM can command lockout to an electrical component of the machine or component to prohibit movement of the machine or component until the lockout is released.

15 Claims, 5 Drawing Sheets

(56) References Cited

U.S. PATENT DOCUMENTS

| | | | |
|---|---|---|---|
| 2014/0348584 A1* | 11/2014 | Fritz | E01C 19/004 404/72 |
| 2016/0167653 A1* | 6/2016 | Malone | H04L 12/403 701/23 |
| 2017/0131718 A1* | 5/2017 | Matsumura | G05D 1/021 |
| 2018/0179734 A1* | 6/2018 | Yamashita | E02F 3/963 |
| 2018/0258610 A1* | 9/2018 | Elkins | B60W 10/30 |
| 2019/0017246 A1* | 1/2019 | Okada | E02F 9/2033 |
| 2019/0277004 A1* | 9/2019 | Hashimoto | E02F 9/267 |
| 2020/0226849 A1* | 7/2020 | Mizuochi | G01S 19/14 |
| 2020/0307965 A1* | 10/2020 | Pinel | B66C 13/46 |
| 2020/0318317 A1* | 10/2020 | Kajiwara | B60T 11/18 |
| 2020/0369280 A1* | 11/2020 | Schwartz | B60T 8/18 |
| 2021/0007295 A1* | 1/2021 | Iyer | A01G 23/006 |
| 2021/0010240 A1* | 1/2021 | Shoemaker | E02F 9/2087 |
| 2021/0180623 A1* | 6/2021 | Tanaka | E02F 9/2267 |

\* cited by examiner

LOCKING OUT A MACHINE TO PROHIBIT MOVEMENT

TECHNICAL FIELD

This disclosure relates to construction equipment. More particularly, this disclosure relates to temporarily locking out a construction machine to prohibit movement of the machine or a component of the machine.

BACKGROUND

Machines, including articulated machines, are used at construction sites and other off-road locations. Such construction machines include one or more implements or components of the machine that are movable outside of a standard footprint or envelope of the machine. Such implements can include, for example, steering of the machine to move the machine right and left, relative to the standard footprint of the machine in a starting position. In another example, such implements can include a dump body which can be hoisted up from a starting position.

There are instances in which it may be desirable to keep the machine running, such as when service is being performed on the machine. However, such operation can potentially be dangerous if movement of the machine or one or more of the implements of the machine is not impeded or prohibited.

U.S. Pat. No. 9,561,820 discloses an uncommanded steering detection system for a machine to determine a steering error and trigger an alarm when the steering error is above a predetermined threshold, such that the machine may be forced to a safe state (i.e. slowed or stopped).

SUMMARY

In an example according to this disclosure, a method of performing a lockout of a construction machine includes collecting information on a status of the construction machine or a component of the construction machine, relaying the collected information to an electronic control module, determining whether to lockout the construction machine, and commanding lockout from the electronic control module to an electrical component of the construction machine. Lockout can prohibit movement of at least one of the construction machine and an implement of the construction machine, without shutting down the construction machine.

In another example according to the present disclosure, a construction machine includes a frame assembly having a front portion and a rear portion, an engine supported by the frame assembly, a plurality of axles attached to the frame assembly and including a front axle supporting the front portion and a rear axle attached to the rear portion, a plurality of wheels comprising one or more pairs of front wheels attached to the front axle and one or more pairs of rear wheels attached to the rear axle, and a braking system to control braking of each of the front and rear wheels. The construction machine further includes a steering sensor to provide a steering signal from a steering mechanism of the construction machine that directs the plurality of wheels, an electronic control module configured to receive, store and execute instructions for operation of the construction machine, and an implement movable through a range of motion independent of movement of the plurality of wheels, the implement comprising an electrical component configured to receive a command from the electronic control module. The electronic control module can provide at least one of a first lockout command to an electrical component of the implement to prohibit movement of the implement and a second lockout command to the braking system to prohibit movement of the plurality of wheels. The first and second lockout commands can be executed without shutting down the construction machine.

In another example according to the present disclosure, a control system for locking down a construction machine includes an electronic control module (ECM) configured to receive, store and execute instructions for operation of the construction machine, an operator interface coupled to the ECM and configured to receive one or more user inputs from an operator of the construction machine, a sensor coupled to the ECM and configured to relay to the ECM a status of the construction machine or an implement of the construction machine, and an electrical component coupled to the ECM, the electrical component configured to control movement of at least one of the construction machine and the implement. The ECM can be configured to provide a lockout command to the electrical component, based on the status relayed by the sensor, to temporarily prohibit movement of at least one of the construction machine and the implement without shutting down the construction machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure is directed to systems and methods for performing a lockout of a construction machine such that the machine or one or more components of the machine is temporarily prohibited from moving, but the machine does not need to be shut down. A lockout command can be sent from a main controller (such as an electronic control module) or sub-controller of the construction machine to an electrical component and the electrical component can lockout the machine or one or more implements or components. Such lockout can include, for example, prohibiting hydraulics, disabling steering, and applying differential clutches. The lockout can be automatically commanded as a result of obstacle detection or for collision avoidance. The lockout can be commanded by an operator using, for example, an operator control panel in the construction machine. The lockout can be commanded by other personnel in a vicinity of or remote to the construction machine.

Figure 1:
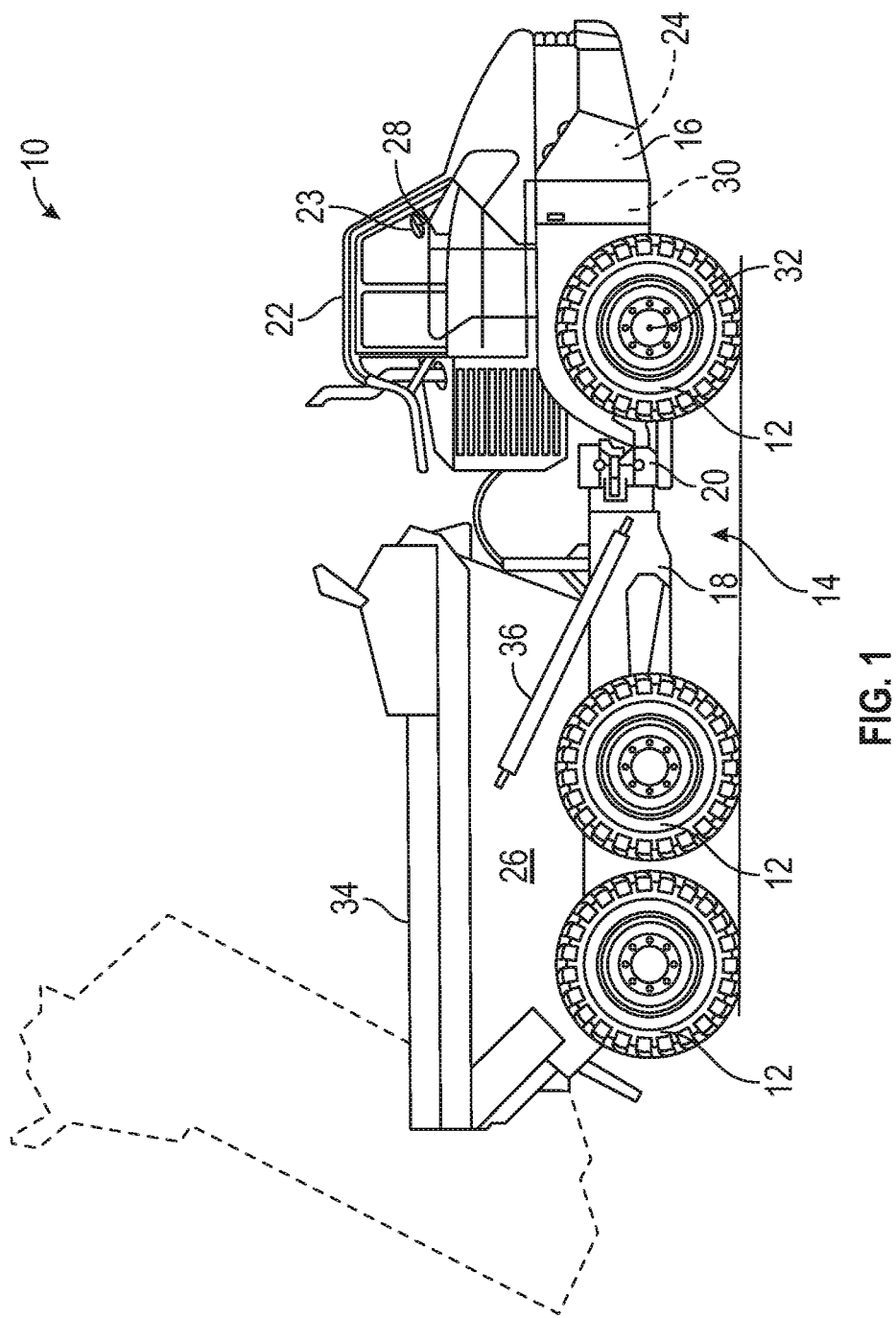
FIG. 1 is a side view of an articulated machine.

FIG. 1 illustrates a machine 10 that includes, among other things, ground engaging members 12 that can support a frame 14, such as a front frame 16 and a rear frame 18. Although the set of ground engaging members 12 are shown as wheels in FIG. 1, it is recognized that ground engaging members 12 can include any other type of traction device. The example machine 10 of FIG. 1 has six wheels 12—two front wheels 12 on the front frame 16 and four back wheels 12 on the rear frame 18. It is recognized that in other examples the machine 10 can include more or less wheels 12.

The front frame 16 and rear frame 18 can be coupled at an articulation joint 20. The front frame 16 can be configured to support an operator cab 22 and a drive system 24. The rear frame 18 can be configured to support a bed or body 26.

The operator cab 22 can include a steering mechanism 23, such as a steering wheel. The steering mechanism 23 can be used to move the vehicle in a desired direction. The operator cab 22 can include an operator interface 28 configured to receive input from and output data to an operator of the machine 10. The operator interface 28 is described further below in conjunction with a control system illustrated in FIG. 2.

The drive system 24 can drive the ground engaging members 12 and can include an engine or other power source that transmits power to a transmission 30. The transmission 30 can operatively transmit power to the ground engaging members 12 via an axle 32. It is noted that the axle 32 is between the pair of front wheels 12 on the front frame 16 of the machine. Similarly, each of the two pairs of rear wheels 12 on the rear frame include an axle.

The body 26 can hold a payload material 34 and can be selectively pivoted between a load position (illustrated in solid line in FIG. 1) and an unload position (illustrated in phantom in FIG. 1). The load position can also be referred to herein as a starting position. The unload position can also be referred to herein as a raised position. One or more hoist cylinders 36 can raise or lower the body 26 in response to commands, including commands from the operator interface 28. In an example, the hoist cylinders 36 can comprise hydraulic cylinders controlled via electrohydraulic valves, such as solenoid valves. In other examples, other configurations can be used to raise and lower the body 26.

The machine 10 can include a hydraulic braking system configured to modulate the brakes of the machine 10. In an example, the hydraulic braking system can include a central pump to pump hydraulic fluid from the hydraulic braking system to and from the various components. In an example, a hydraulic brake can be associated with each of the six wheels 12 on the machine 10.

Figure 5:
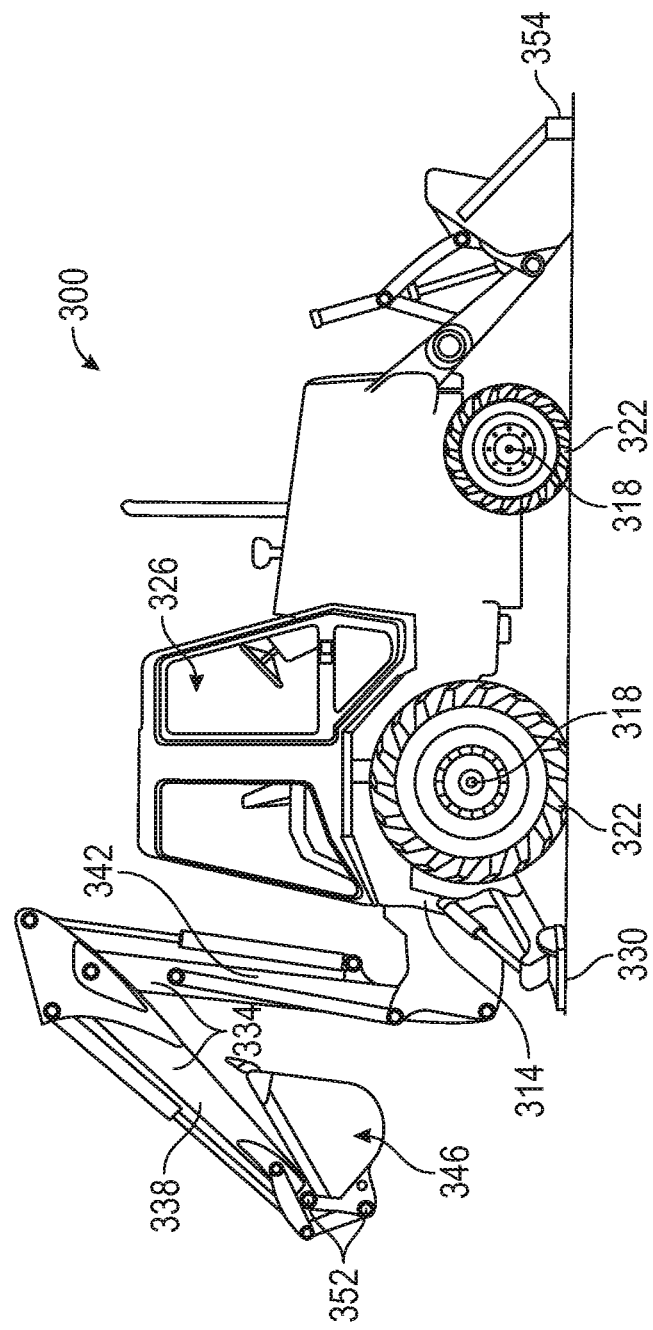
FIG. 5 is a side view of another example machine.

Although the machine 10 of FIG. 1 is illustrated as a truck, the machine may be of any other type. As used herein, the term "machine" refers to a mobile machine that performs a driven operation involving physical movement associated with a particular industry, such as, transportation, earthmoving, construction, landscaping, forestry, agriculture, mining, etc. The machine 10 is shown as an articulating truck with the bed 26 and can be referred to as a dump truck. Although the machine 10 is shown as an articulated machine 10, the present disclosure is applicable to other types of hauling machines, such as non-articulated machines. Other types of machines can include but are not limited to a loader having a bucket and an excavator having a boom. FIG. 5 illustrates another example of a machine 300 having an articulated bucket assembly.

Non-limiting examples of machines include commercial and industrial machines, such as hauling machines, dump trucks, mining vehicles, on-highway vehicles, trains, motor graders, loaders, excavators, earth-moving vehicles, dozers, tractors, backhoes, agricultural equipment, material handling equipment, and other types of machines that operate in a work environment. It is to be understood that the machine 10 is shown primarily for illustrative purposes to assist in describing features of the present disclosure and that FIG. 1 does not depict all of the components of a machine.

The bed 26 can be referred to as a component or an implement of the machine 10. As used herein, the term "implement" can refer to a component of the machine that can be moved outside of a normal or standard envelope of the machine. The implement can be lifted or hoisted, for example, from a starting or standard position to a raised position. In another example, the steering mechanism 23 can be an implement of the machine 10 since the steering mechanism 23 can cause the machine 10 to move from left to right. In the case of an articulated machine, like machine 10 of FIG. 1, the articulation joint 20 can create a pinch point between the front frame 16 and rear frame 18, which can present a safety risk.

There can be instances in which it is desirable or important (for example, from a safety standpoint) to temporarily impede or lockout the machine or one or more components of the machine without turning off the machine entirely. As an example, if service needs to be performed on the machine 10 or a component thereof, it can be beneficial to keep the machine running while performing such service. However, this can present a safety risk if one or more implements of the machine 10 are still operational and are able to move or cause movement of another component. In another example, it can be beneficial to lockout the machine or one or more implements of the machine to avoid a collision or if an obstacle is detected in a vicinity of the machine.

The present disclosure provides a system and method for temporarily impeding movement of the machine or one or more machine implements by commanding a "lockout" or "stand down" of the machine 10. Such command to lockout or stand down the machine 10 can be automated or initiated by the operator. In an example, the machine 10 can be configured such that the lockout or stand down process is automatically initiated when an obstacle is detected within a defined distance of the machine or when an operator exits the cab 22 while the machine 10 is still running. In another example, the lockout or stand down process can be commanded by the operator or commanded remotely when, for example, the machine 10 is to undergo service. Once the lockout is commanded, the machine and one or more implements of the machine can remain stationary at the position each of them was in prior to the lock out command. For example, if the bed 26 was in a raised position, or partially raised, the bed 26 can remain in that position during the lockout. The control system enables the implement to remain in this position until the lockout is released. This is described further below in reference to FIG. 4.

As used herein, the terms "lockout", "locked out" and "locking out" refer to an operational state of the machine 10 in which the machine or one or more implements of the machine 10 are prevented from moving or causing movement of another machine component. The term "lockout" is used interchangeably herein with the term "stand down".

Figure 2:
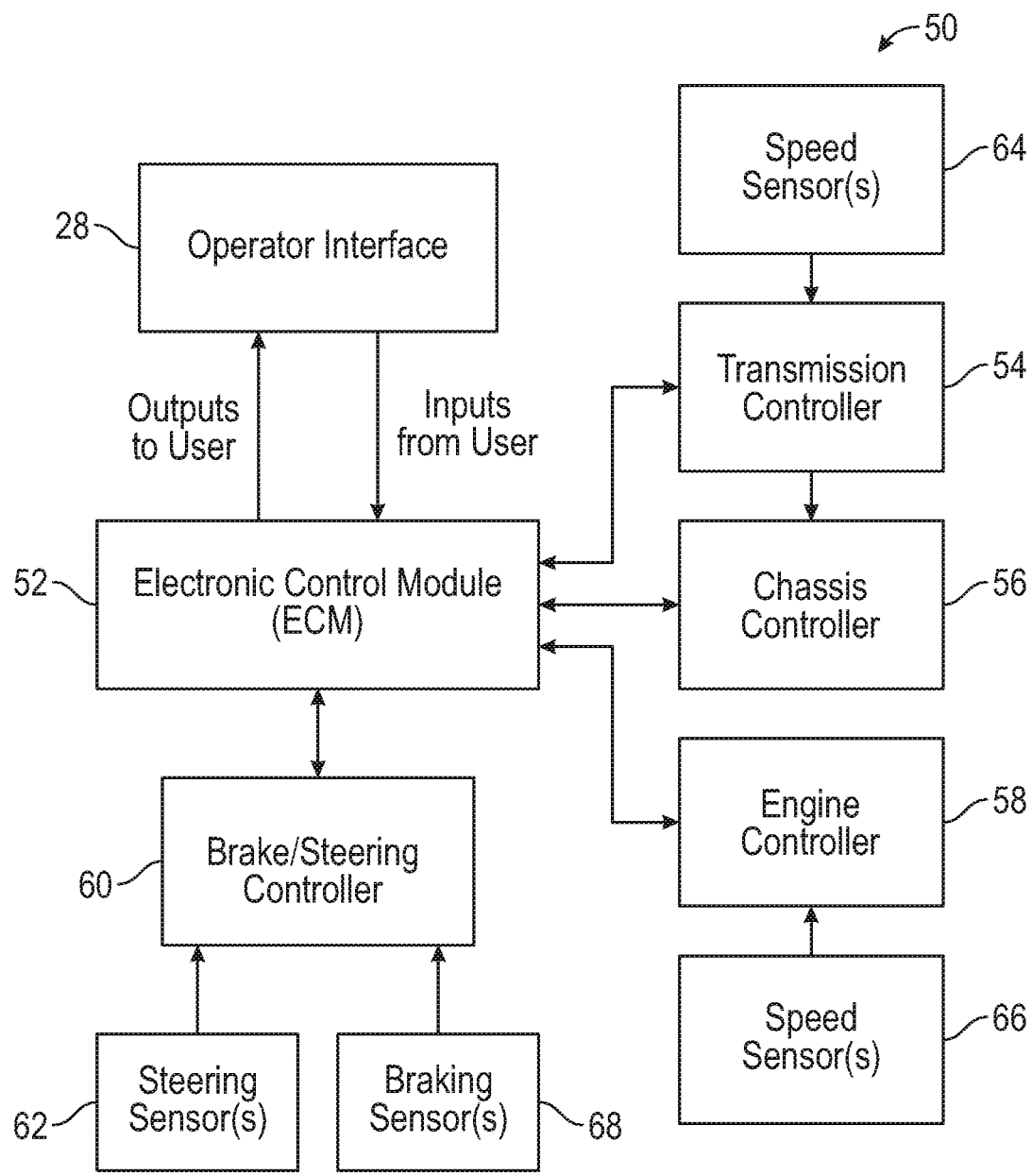
FIG. 2 is a schematic of a control system for operation of the machine in FIG. 1.

FIG. 2 illustrates a control system 50 for locking out a construction machine or one or more implements of the construction machine. For illustrative purposes, the control system 50 is described for locking out the machine 10 of FIG. 1. It is recognized that the control system 50 is applicable to other types of machines within the scope of the present disclosure.

The control system 50 can include an electronic control module (ECM) 52 configured for communication with the operator interface 28 inside the operator cab 22. In an example, the operator interface 28 can be an electronic control panel. The operator interface 28 can receive user inputs and communicate such user inputs to the ECM 52. The ECM 52 can relay outputs to the operator interface 28. In an example, such outputs can be displayed for the operator on the operator interface 28.

The machine 10 can have one or more electronic control units, which can include the ECM 52. The ECM 52 can be an embedded system that controls machine electrical systems and/or other subsystems of the machine. The ECM 52 can be communicatively connected to other components of the machine and configured to send and receive data, sensor or other analog signals, and other information between various other electronic control units of the machine.

In an example, the ECM 52 can be the main control unit of the machine. In an example and as shown in FIG. 2, the control system 50 can include additional electronic control units, such as, for example, a transmission controller 54, a chassis controller 56, an engine controller 58, and a brake/steering controller 60, each of which can have two-way communication with the ECM 52. The brake/steering controller 60 can be in communication with one or more steering sensors 62 configured to receive a steering signal from the steering mechanism 23 of the machine 10 and send a signal to the brake/steering controller 60. The transmission controller 54 can be in communication with one or more speed sensors 64 configured for sensing a ground speed of the machine 10. The engine controller 58 can be in communication with one or more speed sensors 66 configured for sensing an engine speed of the machine 10. The brake/steering controller 60 can also receive a signal from one or more braking sensors 68 regarding a braking pressure to confirm application of brakes of the machine 10. It is recognized that various other sensors can similarly be in communication with one or more of the ECM 52 and the controllers 54, 56, 58 and 60, and such other sensors can be in addition to or as an alternative to the sensors specifically shown in FIG. 2.

The control system 50 can be configured to enable the stand down functions described above for the machine 10 or one or more implements of the machine 10. The stand down process is described further below in reference to a process flow chart of FIG. 4. The control system 50 of FIG. 2 is an example configuration for controlling operation of the machine 10. It is recognized that additional configurations of the control system 50 can be used to operate the machine. For example, more or less of the controllers 54, 56, 58 and 60 can be included in the control system 50. In another example, the functions of one or more controllers 54, 56, 58 and 60 can be performed by the main controller, ECM 52.

The ECM 52 can include software, hardware, and combinations of hardware and software configured to execute a number of functions attributed to the components of the machine described herein. The ECM 52 can include an analog, digital, or combination analog and digital controllers having a number of components. As examples, the ECM 52 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECM 52 can include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of the ECM 52.

The ECM 52 can be configured to communicate with other components of the machine via various wired or wireless communications technologies and components using various public and/or proprietary standards and/or protocols. Examples of transport mediums and protocols for electronic communication between components of the machine include Ethernet, Transmission Control Protocol/Internet Protocol (TCP/IP), 802.11 or Bluetooth, or other standard or proprietary transport mediums and communication protocols.

The various components of the machine can be connected to the ECM 52 via a wired or wireless connection. The ECM 52, or corresponding controllers 54, 56, 58 and 60, can control additional features and components of the machine in addition to those specifically described herein. Updates to the ECM 52 can be installed onto the ECM 52, using, for example, hardware flashing. Software changes can be made to the ECM 52 to accommodate software updates and/or reflect a particular design of the machine or changes made after the machine was assembled.

The ECM 52 or at least one of the controllers 54, 56, 58 and 60 can include software for communicating stand down instructions to an electrical component of an implement of the machine 10. The software can include software control limits to enable the electrical component to lockout the implement such that the implement is temporarily prohibited from moving. Such software can be included in the ECM 52 (or the particular sub-controller 54, 56, 58 and 60) when the ECM 52 (or sub-controller) is installed in the machine 10. Alternatively, the ECM 52 or the sub-controller can be updated with the software that enables the lockout procedure described herein. As such, the lockout procedure of the present disclosure can be incorporated into new machines, as well as existing machines that are out in the field via software updates.

Figure 3:
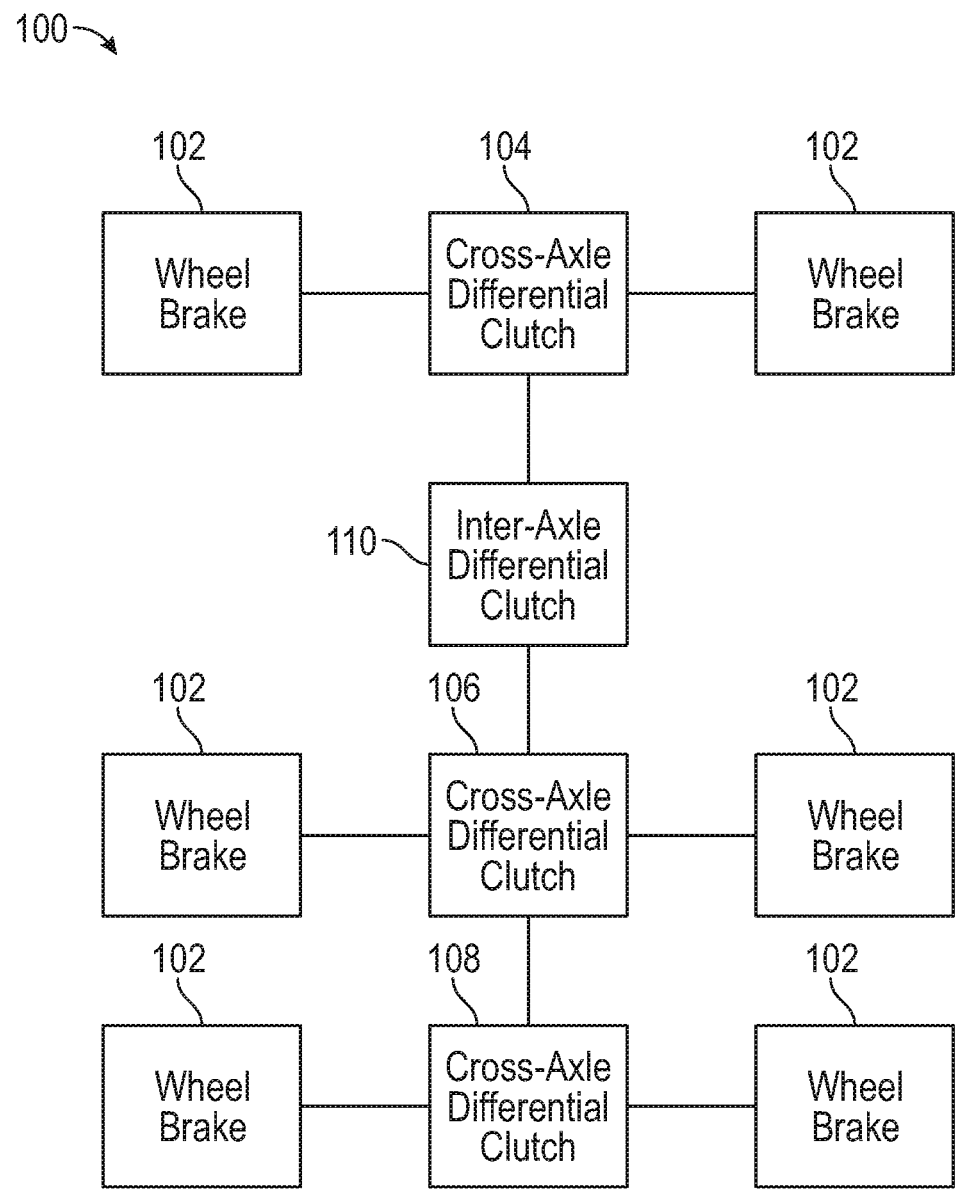
FIG. 3 is a schematic of a drivetrain for the machine in FIG. 1.

FIG. 3 is a schematic illustrating a drivetrain 100 of the machine 10. Wheel brakes 102 correspond with each of the six wheels 12 of the machine 10. A driveshaft can run longitudinally down the machine 10. A plurality of axles can be attached to the frame 14 of the machine. The front axle 32 (see FIG. 1) can support the front frame 16 (and two corresponding front wheels 12) and two rear axles can support the rear frame 18 (and four corresponding rear wheels 12).

Each axle can include a respective differential. The front axle 32 can include a cross-axle differential clutch 104 between the front wheels 12. The first rear axle can include a cross-axle differential clutch 106 between the first set of rear wheels 12. The second rear axle can include a cross-axle differential clutch 108 between the second set of rear wheels 12. The drivetrain 100 can include an inter-axle differential clutch 110, which can function as a central differential in the drive shaft 100 between the front frame 16 and rear frame 18.

The brake/steering controller 60 of FIG. 2 can be in communication with each of the differential clutches 104, 106, 108 and 110 and the wheel brakes 102 (hydraulic) for each of the wheels 12 of the machine 10. The differential clutches 104, 106, 108 and 110 can each include a solenoid valve that can be electronically locked and unlocked. The wheel brakes 102 can be configured to physically limit steering or movement of the machine. Although the differential clutches and wheel brakes can be independently controlled and commanded, they can work in conjunction to create a physical limitation on steering the machine 10. The stand down or lockout procedures described herein can be applied to the braking and steering systems without having to add hardware to physically lockout the braking or steering system.

Figure 4:
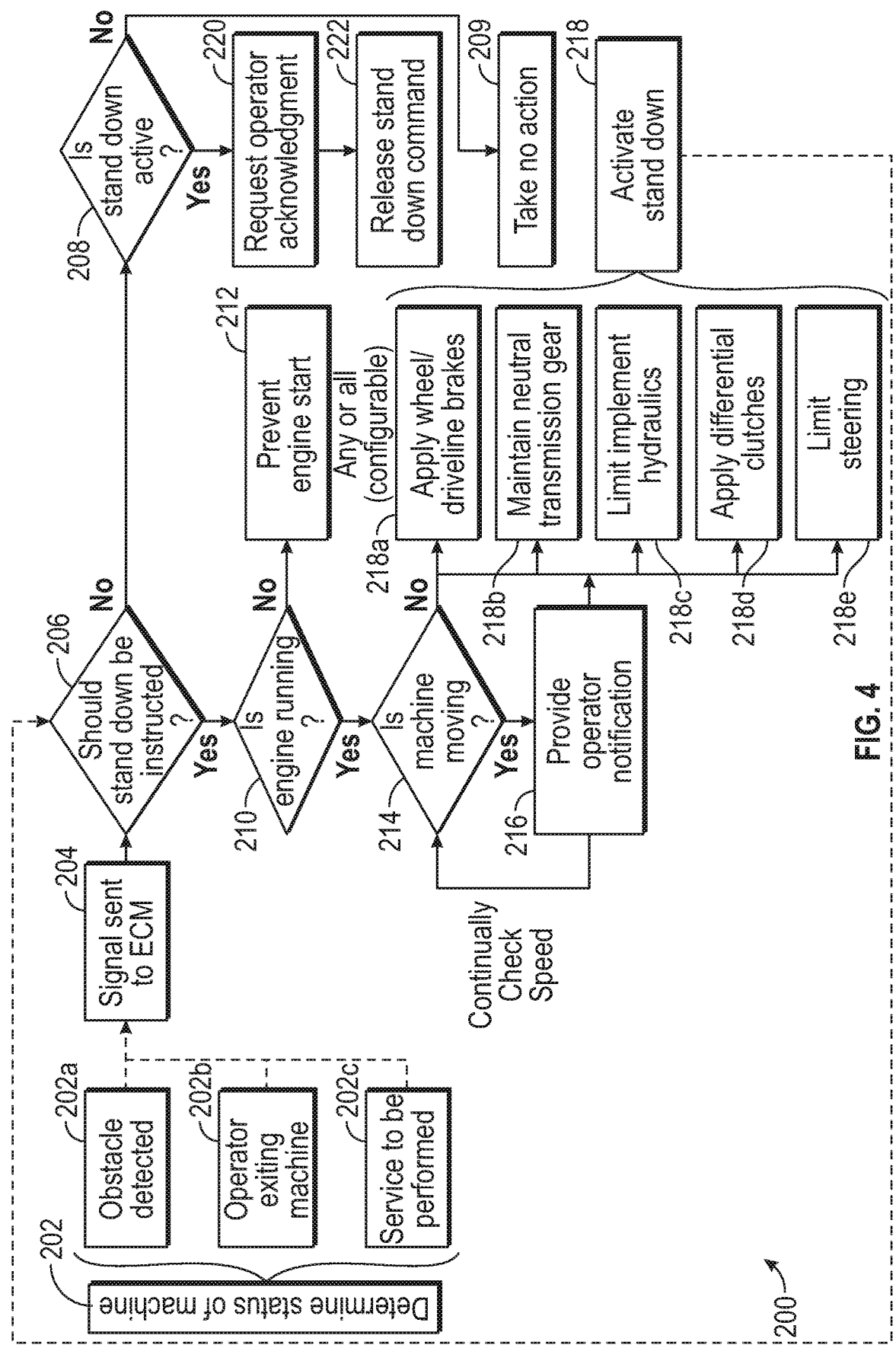
FIG. 4 is a flowchart of an example process for performing a stand down of the machine of FIG. 1.

FIG. 4 is a flow chart depicting an example process 200 for performing a stand down of the machine 10 or one or more implements of the machine 10. As provided above, the machine 10 is used as an example. The flowchart in FIG. 4 is applicable to performing a stand down for other construction machines.

The process 200 can include at 202 determining a status of the machine 10. Such status is used to determine whether to lockout the machine 10. For example, at 202a if an obstacle is detected within a defined distance of the machine 10, a stand down or lockout can be initiated to avoid damage to the machine or obstacle or avoid injury to an operator of the machine or other persons around the machine. In an example, one or more sensors or other features on the machine 10 can be used for obstacle detection. In another example, at 202b if it is determined that the operator has exited the cab 22 without shutting down the machine 10, a stand down or lockout can be initiated. A sensing device can similarly be used to determine if the operator exits the cab 22. In yet another example, a stand down or lockout can be initiated in advance of performing service (202c) on the machine 10. There may be additional circumstances, in addition or as an alternative to those shown in FIG. 4, under which lockout or stand down may be appropriate or beneficial.

At 204 a signal can be sent to the ECM 52 communicating the determined status at 202. In some examples, the signal can be automatically sent to the ECM 52 by one or more sensing devices associated with circumstances described under 202. In other examples, the signal can be sent to the ECM 52 as the result of an input to the operator interface 28. Such input can be entered into the operator interface 28 by the operator or other personnel. Alternatively, the signal can be remotely sent to the ECM 52 from another device in electronic communication with the ECM 52.

The step of sending a signal to the ECM 52 at 204 can include direct communication to the ECM 52. Alternatively, a signal can be sent to a sub-controller (such as controllers 54, 56, 58 or 60 in FIG. 2) and the sub-controller can relay such signal to the ECM 52

At 206 the ECM 52 can determine whether to stand down or lockout the machine 10 based on the information relayed to the ECM 52 at 204. If stand down has already been activated (at 218) but is no longer needed (No at 206), stand down can be released at 220 and 222. This is described further below. If stand down should not be instructed (No at 206) and stand down is not active (No at 208), then at 209 no action is taken. If the ECM 52 determines that stand down should be initiated, a next step in the process can be to determine at 210 whether the engine is running. If the engine is not running, a next step in the process can be to prohibit the engine from starting at 212. If the engine is running, at 214 the process can include determining whether the machine 10 is moving. If the machine 10 is moving, the operator can be notified at 216 of the stand down, such that the operator can stop the machine and then at 218 the stand down can be commanded or activated. If the machine 10 is not moving at 214, the next step can be to command stand down or lockout at 218. As shown in FIG. 4, speed can be continually checked (via speed sensors described above) between 214 and 216. The process 200 can be configured such that stand down cannot be activated at 218 until the machine 10 is stopped and once stand down is activated, speed is continually checked to make sure the machine remains stopped.

Multiple examples of how the stand down can be commanded are included in FIG. 4. Any or all of these commands 218a-218e can be employed for the stand down or lockout of the machine 10 or one or more implements of the machine 10. As described above, the software of the ECM 52 or a sub-controller can include software control limits such that the command to stand down or lock out the implement(s) can be sent from the ECM 52 or the sub-controller to the electrical component of the implement(s). The electrical component can be an existing component of the machine 10. Thus, the systems and methods described herein for performing the stand down or lock out can be included in new machine designs or existing machines out in the field.

Once stand down is activated at 218, there can be an ongoing check at 206 as to whether stand down should continue or be released. This is represented by the dotted line in FIG. 4 from 218 to 206. If at 206 it is determined that stand down should not be instructed (No at 206), and at 208 it is determined that stand down is active (Yes at 208), steps are taken at 220 and 222 to release the stand down or lock out. Before releasing the stand down command, at 220 operator acknowledgment is requested. In an example, such acknowledgment can include the operator selecting a display on the operator interface. An alternative to operator acknowledgment can be operator notification. In an example, operator notification can be in the form of a light or icon on the operator interface. At 222, the stand down (activated at 218) can be released and the machine can resume normal operation. Once the stand down is released, the machine and the various components of the machine can operate normally and through their designed range of motion.

FIG. 5 illustrates another example of a construction machine 300 that can incorporate the system and method of the present disclosure to command a lockout for temporarily prohibiting movement of the machine 300 or one or more implements of the machine 300.

The construction machine 300 can include a frame 314 attached to a pair of axles 318 mounting a set of wheels 322. An operator cab 326 can be supported on the frame 314. A pair of stabilizers 330 can be movably attached to the frame 314. A pair of articulating arms 334 can be pivotally connected to the frame 314 and can include a boom 338 and a stick 342 which can extend from the rear of the operator cab 326. A bucket assembly 346 can be pivotally attached to the end of the boom 338 via pins 352. The bucket 346 can be referred to as a rear bucket. In the example shown in FIG. 5, the machine 300 can also include a front bucket assembly 354.

The machine 300 can include one or more implements, such as the bucket assembly 346 or 354, which can move through a range of motion as a function of the articulating arms 334. The present disclosure for commanding a lockout can be applicable to the machine 300 (and other similar machines used in the construction industry) in a similar manner as described above in reference to the machine 10. The above description of FIGS. 2-4 can generally apply to the machine 300 and other similar machines.

The machines 10 and 300 can either be considered an articulated machine and/or include an articulating component. It is recognized that the methods and systems described herein for performing a lockout can also be applicable to machines or vehicles that are non-articulating. In an example, the method and systems described herein can be used to lockout an off-highway truck by locking out the steering system. Such lockout can be performed, for example, by way of a check valve that can limit the pilot pressure supply. Other features can be used in addition or as an alternative to the check valve to carryout the lockout procedure described herein.

INDUSTRIAL APPLICABILITY

Example machines in accordance with the present disclosure can be used in a variety of applications, such as for road construction and at off-road construction sites.

The lockout or stand down procedure described herein can be used to effectively prohibit the machine or one or more implements of the machine from moving, without requiring a complete shut down of the machine. A signal can be sent to the electronic control module (ECM) of the machine to initiate the lockout procedure. The signal can be generated as a result of an automated detection (such as, for example, object detection/collision avoidance or operator departure from the cab) or operator selection. The ECM or sub-controller can communicate electronically with existing components of the machine to prohibit movement of one or more implements of the machine.

The one or more implements can be configured to be movable through a range of motion independent of movement of the rest of the machine. An example implement is a bed that can hoisted from a load position to an unload position. The ECM can temporarily lock out the bed to prevent the bed from moving even though the machine is still on. Once the lock out is commanded, the bed can remain stationary at the position it was in immediately prior to the lock out command. Such position can be any position, including and between the loaded position and the unloaded position. In an example, the lock out procedure can include temporarily locking out the steering of the machine such that the wheels are prohibited from moving even though the machine is still on.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A method of performing a lockout on a construction machine, the method comprising:
   collecting information on a status of the construction machine or a component of the construction machine, wherein the component comprises an implement movable through a motion independent of movement of a plurality of wheels of the construction machine, the implement comprising an electrical component configured to receive a command from an electronic control module;
   relaying the collected information to the electronic control module, wherein the electronic control module configured to receive, store and execute instructions for operation of the construction machine;
   determining with the electronic control module whether to perform a first lockout and a second lockout gf the construction machine;
   initiating the first lockout and the second lockout with an operator interface coupled to the electronic control module configured to receive inputs from an operator of the construction machine;
   commanding the first lockout from the electronic control module to the implement to prohibit movement of the implement; and
   commanding the second lockout from the electronic control module to a braking system of the construction machine to prohibit movement of the plurality of wheels;
   wherein the first lockout and the second lockout are executed without shutting down the construction machine.

2. The method of claim 1 wherein collecting information on the status of the construction machine includes detecting an obstacle in a vicinity of the construction machine, and wherein the detecting the obstacle in the vicinity of the construction machine is performed by one or more automated features.

3. The method of claim 1 wherein the implement is a bed of the construction machine and the bed is movable between a starting position and a raised position.

4. The method of claim 3 wherein the bed is hydraulically moved from the starting position to the raised position, and commanding the first lockout from the electronic control module to the implement includes commanding an electro-hydraulic valve of the bed to prohibit any movement of the bed until the lockout is released.

5. The method of claim 1 wherein commanding the second lockout includes at least one of applying wheel/driveline brakes and commanding differential clutches, and the second lockout prohibits any movement of the construction machine until the lockout is released.

6. The method of claim 5 wherein commanding the second lockout includes providing an operator notification prior to the second lockout.

7. The method of claim 1 wherein the implement is a bucket of the construction machine and the bucket is attached to an articulating arm.

8. The method of claim 1 wherein commanding the first lockout includes relaying a signal to an implement controller, and the implement controller commands the electrical component of the implement.

9. The method of claim 1 wherein commanding the second lockout includes activating a check valve that thereby limits pilot pressure supply to prohibit steering of the construction machine.

10. A construction machine comprising:
    a frame assembly having a front portion and a rear portion;
    an engine supported by the frame assembly;
    a plurality of axles attached to the frame assembly, the plurality of axles including a front axle supporting the front portion and a rear axle attached to the rear portion;
    a plurality of wheels, the plurality of wheels comprising:
    one or more pairs of front wheels attached to the front axle; and
    one or more pairs of rear wheels attached to the rear axle;
    a braking system to control braking of each of the one or more pairs of the front and rear wheels;
    a steering sensor to provide a steering signal from a steering mechanism of the construction machine that directs the plurality of wheels;

an electronic control module configured to receive, store and execute instructions for operation of the construction machine;

an operator interface coupled to the electronic control module and configured to receive inputs from an operator of the construction machine; and an implement movable through a motion independent of movement of the plurality of wheels, the implement comprising an electrical component configured to receive a command from the electronic control module, wherein the electronic control module provides: a first lockout command to the electrical component of the implement to prohibit movement of the implement and a second lockout command to the braking system to prohibit movement of the plurality of wheels, wherein the first lockout command and the second lockout command are executed without shutting down the construction machine, and wherein the operator interface is configured to the operator to initiate the first lockout command and the operator interface is configured for the operator to initiate the second lockout command.

11. The construction machine of claim 10 further comprising:

an articulation joint connecting the front and rear portions and configured to allow pivotal movement of the construction machine about the articulation joint.

12. The construction machine of claim 11 wherein the implement is a bed connected to the frame assembly and configured to carry a payload, the bed hydraulically movable between a starting position to a raised position, and wherein the electrical component of the implement is an electrohydraulic valve of a hydraulic cylinder.

13. The construction machine of claim 10 further comprising one or more features configured for detection of an obstacle in a vicinity of the construction machine, the one or more features configured for communication with the electronic control module.

14. A control system for locking out a construction machine, the control system comprising:

an electronic control module (ECM) configured to receive, store and execute instructions for operation of the construction machine;

an operator interface coupled to the ECM and configured to receive one or more user inputs from an operator of the construction machine;

a sensor coupled to the ECM and configured to relay to the ECM a status of the construction machine or an implement of the construction machine; and an electrical component coupled to the ECM, the electrical component is an electrohydraulic valve configured to control movement of at least one of the construction machine and the implement, wherein the ECM is configured to provide a lockout command to the electrical component, based on the status relayed by the sensor, to temporarily prohibit movement of at least one of the construction machine and the implement without shutting down the construction machine, and wherein the lockout command includes:
applying wheel/driveline brakes;
applying differential clutches;
limiting steering;
limiting implement hydraulics; and
maintaining neutral transmission gear.

15. The control system of claim 14 wherein the one or more user inputs includes an operator selected lockout function communicable to the ECM to provide the lockout command to the electrical component.

* * * * *